May 1, 1923.

J. N. FARLOW 1,453,497

THEFT PREVENTION DEVICE FOR AUTOMOBILES.

Filed March 13, 1922

INVENTOR
J. N. FARLOW

ATT'YS.

Patented May 1, 1923.

1,453,497

UNITED STATES PATENT OFFICE.

JAMES N. FARLOW, OF SAN FRANCISCO, CALIFORNIA.

THEFT-PREVENTION DEVICE FOR AUTOMOBILES.

Application filed March 13, 1922. Serial No. 543,495.

*To all whom it may concern:*

Be it known that I, JAMES N. FARLOW, a citizen of the United States, residing at San Francisco, in the county of San Francisco and State of California, have invented new and useful Improvements in Theft-Prevention Devices for Automobiles, of which the following is a specification.

This invention relates to improvements in devices for preventing theft of automobiles and like vehicles and has particular reference to a simply constructed, inexpensive and highly effective device which may be readily and easily attached to a vehicle axle in such manner that it will render the steering mechanism of the vehicle inoperative, but permit of limited movement of the vehicle, as would be required in emergency cases.

An object of the invention is to provide a motor vehicle theft prevention device of the character described which is strong, durable, small and compact and not subject to being readily broken, deranged or removed after it is disposed in its operative position to prevent the steering movement of the front wheels of the motor vehicle, said device being adjustable so as to be attachable to various makes and constructions of automobile without necessitating any change in the construction of the device or of the automobile to which it is attached.

Another object of the invention is to provide a device of the character described which is in the nature of a stay adapted to be readily attached to the axle of a vehicle so that one of the front wheels after being turned into an extreme steering position will be held against movement out of said position, whereby an attempt to make-off with the vehicle will be prevented in that the vehicle cannot be run in a straight line or direction but will turn, owing to the disposition of the front wheels.

The invention possesses other advantages and features some of which, with the foregoing will be set forth at length in the following description where I shall outline in full that form of the invention which I have selected for illustration in the drawings accompanying and forming a part of the present specification. In said drawings I have shown one form of the construction of my invention, but it is to be understood that I do not limit myself to such form since the invention as expressed in the claims may be embodied in a plurality of forms.

Referring to the drawings.

Figure 1:
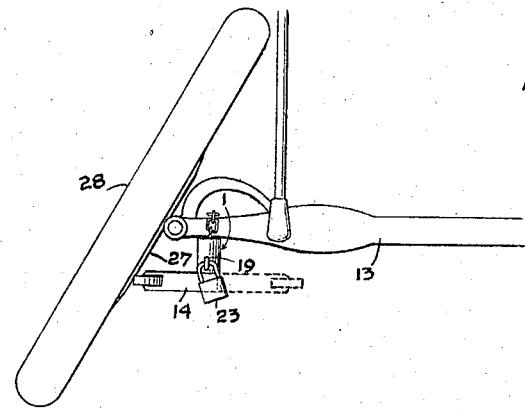
Fig. 1 represents a fragmentary plan view of a motor vehicle showing the device of my invention as it will appear when in operative position holding the front wheels in a position such as will render the steering mechanism of the automobile inoperative.

Referring to the embodiment of the invention illustrated in the accompanying drawings, 1 designates an angular body, the main portion 2 of which is in the form of a hollow cylinder, whereas the remaining portion extends right angularly from one end of the portion 2 in the form of plate like projections 3 and 4, which projections are integral with the portion 2. Means is provided for securing the device to the vehicle and the means preferably comprises a link chain 5, but may be otherwise as desired. One end of the link chain 5 is riveted as at 6 between the free ends of the portions or projections 3 and 4, the other end of the chain is permanently mounted upon an adjusting and securing bolt 7, which bolt is bent at right angles as at 8 adjacent to its head so as to facilitate the attachment of the chain 5 thereto. The bolt is adapted to be extended thru an opening 9 formed in the projection 4 and has a nut 10 and a washer 11 upon its inner threaded end to provide for adjustably holding the bolt in position. One side of the body portion is cut away to provide an opening 12 whereby access to the nut for adjustment of the bolt is provided for. The chain is adapted to encircle the axle 13 of a vehicle adjacent to one end thereof so that the device, as will be later more fully described, may be attached for operation.

A substantially L shaped stay member 14 has one leg 15 thereof in cylindrical and preferably hollow form and is adapted to be inserted in the portion 2 so that it is rotatable therein, and the other leg 16 thereof will extend at right angles to said portion 2. The hollow portion 15 is provided with registering openings 17 adapted to aline with similar openings 18 in the portion 2 of the body, whereby a pin 19 may be inserted thru said registering openings to hold the member 15 against turning. The pin 19 is provided at one end with a head 20 and at its other end with an aperture 21, thru which aperture the hasp of a padlock 23 is inserted so as to lock the pin in place. When the circular portion 15 is inserted in the portion 2, it closes the opening 12 and houses the inner end of the bolt 7 so that access to the nut is prevented and the bolt and nut are concealed.

The outer end of the portion 16 of the member 14 is bifurcated as at 24 and has mounted in the bifurcated part, a roller 25, which roller 25 is held in place by a rivet 26. The roller is adapted to engage upon the hub portion 27 of a front wheel 28 of the vehicle.

Figure 2:
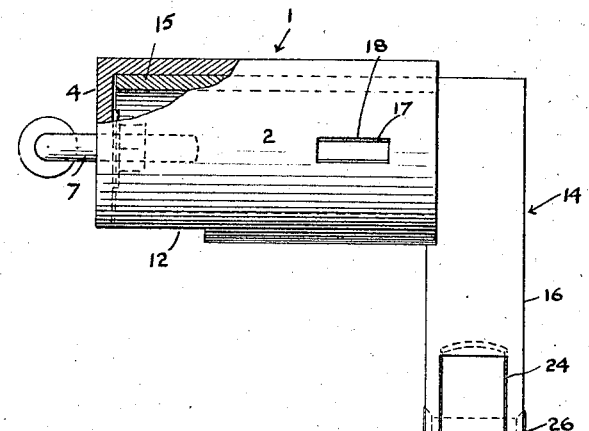
Fig. 2 is an enlarged top plan view of the device of the invention.
Figure 3:
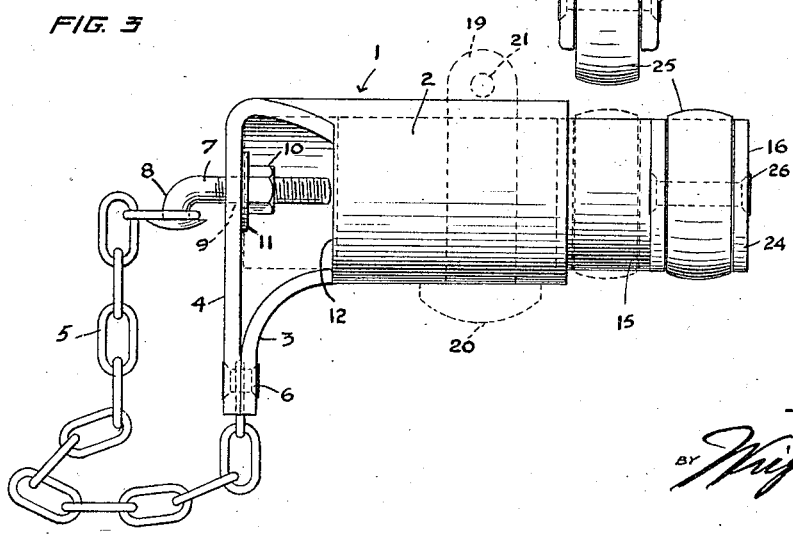
Fig. 3 is an enlarged side elevation of the invention adjusted so as to permit of access to the parts thereof, the normal position being shown in dotted lines.

To attach the device, the steering gear of the automobile or vehicle is operated so as to turn the front wheels outwardly or inwardly as the case may be, preferably so as to extend away from the curbing, to the full extent, so that the wheels will assume a position such as required to make a sharp right turn. The bolt 7 may be removed by unscrewing the nut 11 and the chain 5 is then placed around the axle 13 and the bolt 7 inserted thru the opening 9 in the portion 4. The nut 11 is then screwed onto the bolt (access being permitted from the end of the portion 2 of the body or thru the opening 12), so as to cause the chain to tightly grip upon the axle whereby the body portion will be rigidly held in an outwardly and horizontally extending position in front of the axle. The member 14 is then mounted in place so that the portion 15 thereof will receive the nut and bolt as shown in Fig. 2, and close the opening 12 in the body portion 1. The right angularly extending portion 16 of the member 14 is turned so as to lie in a substantially horizontal position with the roller 25 engaging the hub portion 27 of the adjacent wheel 28. When the member 16 is thus disposed the openings 17 and 18 are in registration with one another and the pin 19 is inserted therethru so that the apertured end 21 is accessible. The padlock 23 is then mounted, as shown, in the aperture and locked so as to hold the pin 19 in place. With the device thus mounted upon the axle of an automobile the wheel 28 is held in its extreme steering position and the steering gear of an automobile cannot be properly operated to drive the automobile forwardly. The vehicle may be moved as the wheels, though held inoperative against steering, are permitted to turn, but the vehicle in moving will turn in a circle and cannot be driven away from a given point other than within the circle in which it is permitted to turn.

This movement permitted the vehicle, is sufficient to provide for emergency moving, such as would be required in case of fire or accident. The roller 25 will rotate when the wheel 28 is turned so as to avoid scratching or damaging of the automobile wheel and will eliminate unnecessary friction. When it is desired to render the device of the invention inoperative, the pin 19 may be removed and the L shaped member turned so that the portion 16 extends inwardly as shown in dotted lines in Fig. 1, after which the pin may be reinserted and locked in place. When the device is thus arranged, it does not in any manner interfere with the operation of the steering mechanism of the vehicle. The chain may be adjusted to fit axles of various sizes by adjusting the nut 11 on the bolt 7.

I claim:

1. A theft prevention device for automobiles embodying in its construction a member adapted for attachment to a vehicle axle and arranged to engage a front wheel of an automobile so as to prevent operation of the automobile steering gear and a roller on said member arranged to engage with said wheel.

2. A theft prevention device for automobiles comprising a body member, means for attaching said body member to the front axle of an automobile, a member having a part thereof rotatably mounted in the body and another part adapted to be moved into and out of engagement with one of the front wheels of a vehicle, means for locking said last named member on the body and a roller on said last named member adapted for engagement with said wheel.

3. An automobile theft prevention device comprising a body member, means for attaching the body member to an axle of an automobile, an angular member rotatable on the body and adapted to be moved into and out of a position engaging the front wheel of a vehicle and means for locking said last named member in engagement with said wheel, said means for attaching the body to the axle being adjustable so as to cooperate with axles of different sizes.

4. A theft prevention device for automobiles comprising a body member having a hollow portion, means for attaching the body portion to the axle of an automobile, an angular member, one portion of which is rotatable in the hollow portion of the body member and the other portion of which is adapted to be moved into and out of engagement with a wheel of the automobile upon rotation of the first named portion thereof and means for locking the rotatable portion of the angular member against rotation to hold the wheel engaging portion in either operative or inoperative position.

5. A theft prevention device for automobiles comprising a hollow body portion open at one end and having an opening on one side thereof, a member adapted to clamp around the axle of an automobile, which member is connected with the body portion, means for adjustably securing said member to the body portion, which means is accessible for adjustment through the opening in the side of said body member, a member adapted to be moved into and out of position engaging the front wheel of the automobile having a portion thereof rotatable in the body member and movable into and out of position to close the opening in the side of said body member and means for locking the wheel engaging member in wheel engaging position.

6. A theft prevention device for automobiles comprising a hollow body member, means for attaching said body member to the axle of an automobile, a member longitudinally movable and rotatable within the hollow body member, a projection extending angularly from the outer end of the rotatable member movable into and out of engagement with the wheel of an automobile upon rotation of the rotatable member and means for locking the rotatable member in position to hold the wheel engaging member in wheel engaging and out of the way positions.

7. A theft prevention device for automobiles comprising a body member, means for attaching the body member to the axle of an automobile, means for adjusting the last named means to provide for the securing of the body member to axles of different sizes, an angular member adjustably supported by the body member and capable of movement to engage a front wheel of the vehicle, and means for locking the angular member in wheel engaging position, said angular member preventing access to the adjusting means when in wheel engaging position.

JAMES N. FARLOW.